Nov. 6, 1951         I. S. BOYDSTUN         2,574,166
DEVICE FOR DISPENSING DISCRETE PARTICLES
Filed April 3, 1947                         2 SHEETS—SHEET 1
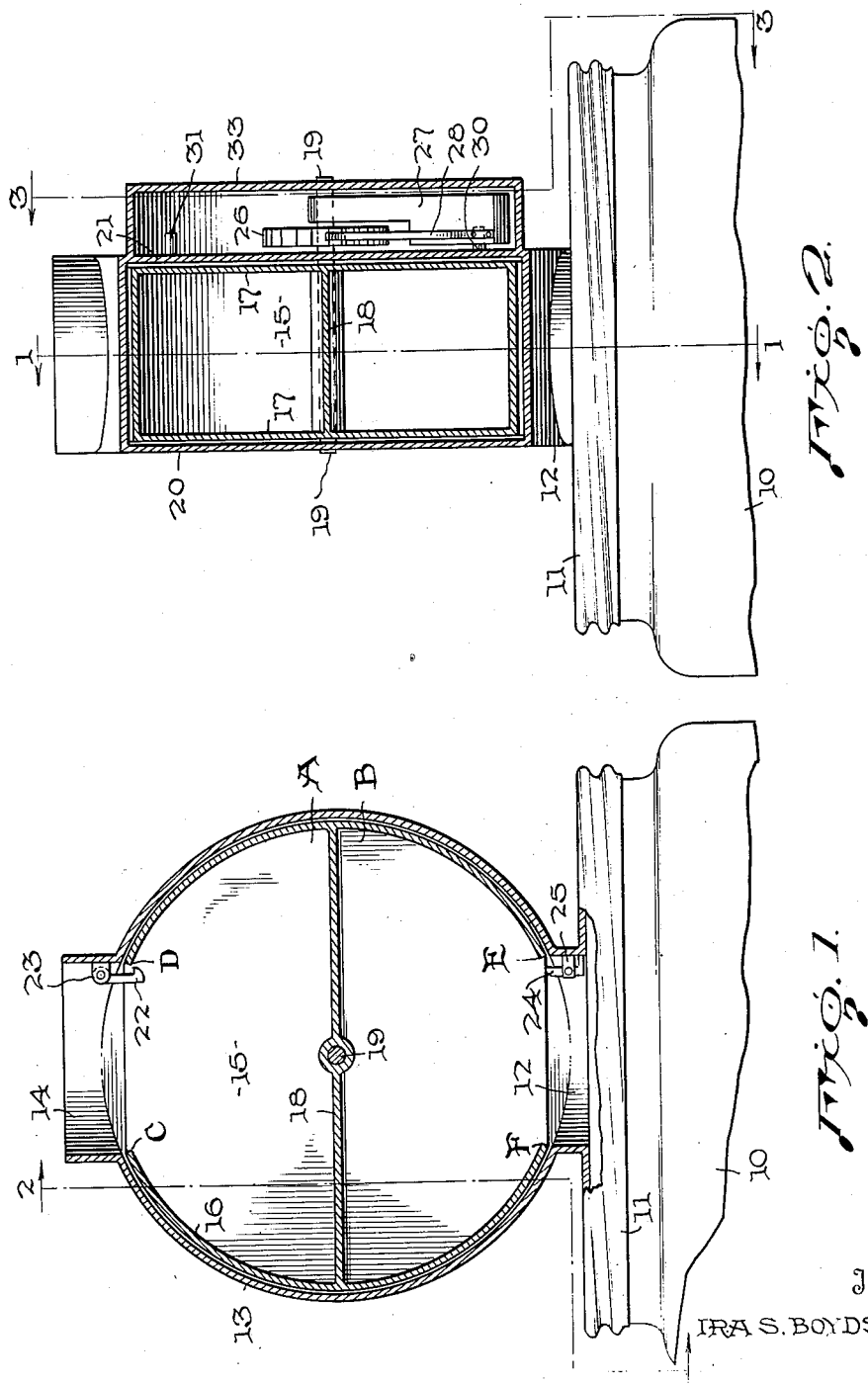
Inventor
IRA S. BOYDSTUN Nov. 6, 1951  I. S. BOYDSTUN  2,574,166
DEVICE FOR DISPENSING DISCRETE PARTICLES
Filed April 3, 1947  2 SHEETS—SHEET 2
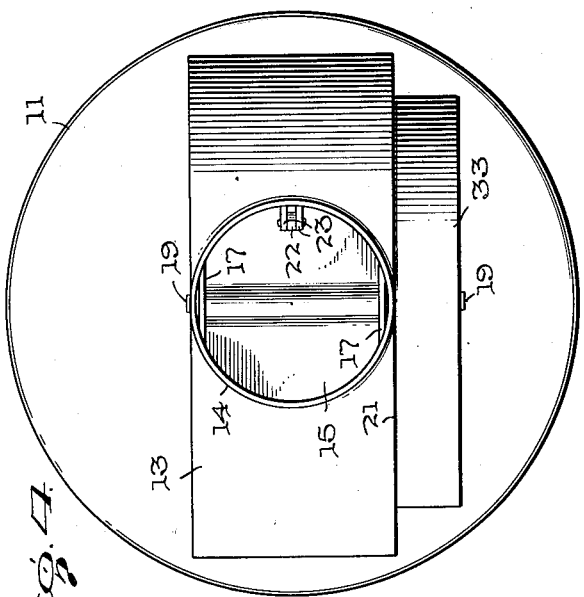
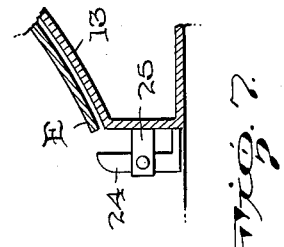
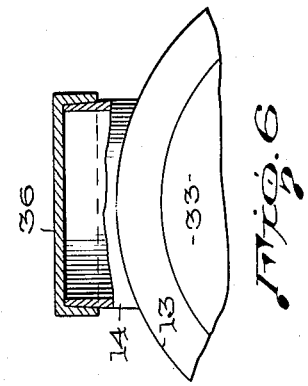
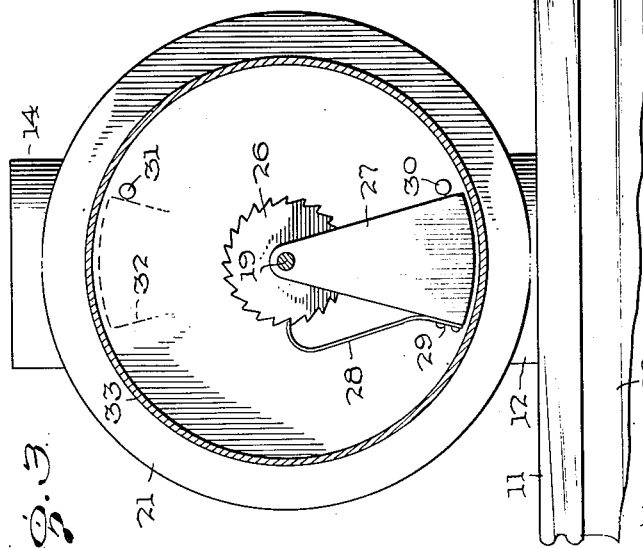
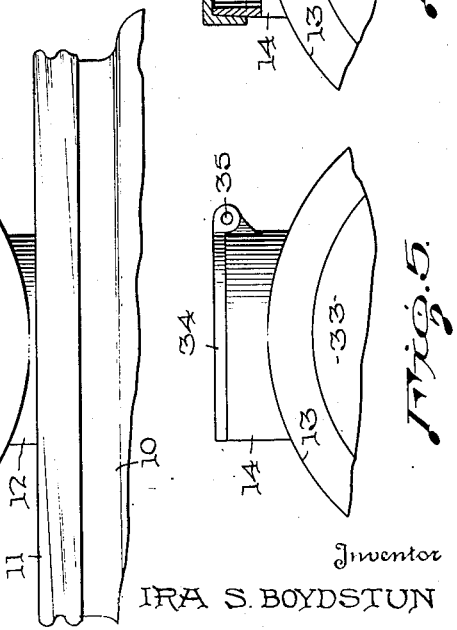
Inventor
IRA S. BOYDSTUN
By Gordon M. Atherholt
Attorney Patented Nov. 6, 1951

2,574,166

UNITED STATES PATENT OFFICE 2,574,166

DEVICE FOR DISPENSING DISCRETE PARTICLES

Ira S. Boydstun, Houston, Tex.

Application April 3, 1947, Serial No. 739,042

4 Claims. (Cl. 222—368)

This invention relates to a device for dispensing discrete particles, and more particularly it relates to a device to be mounted on top of a container and which will dispense a measured quantity from the container each time it is inverted.

One object of this invention is to provide a dispensing device that will repeatedly deliver measured quantities of discrete particles of solid material without the customary manual measuring with separate measuring devices.

Another object of this invention is to provide a device of the character previously mentioned that will handle solid material in particle size ranging from the finest powder up to the size of a coffee bean.

Another object of this invention is to provide a dispensing device of the character described that is readily attachable to standard commercial containers and which can readily be removed from an emptied container and be attached to another container.

This dispensing device can readily be provided to fit all sizes of commercial containers and is particularly convenient and advantageous for dispensing measured quantities of coffee, regardless of whether the coffee be powdered, finely ground, coarsely ground, or in the whole bean. Likewise the device is especially advantageous for dispensing measured quantities of sugar, salt, meal, flour, baking powder, dry powdered or granulated drugs, etc.

This dispensing device is designed to deliver identical volumes each time the container to which it is attached is inverted, but the devices can be made in different sizes to deliver any predetermined volume. For instance the device can be constructed to invariably deliver a teaspoonful, or to invariably deliver a cupful. A tablespoonful size would be particularly convenient for coffee, the teaspoonful for sugar, and the cupful for flour. Any other prescribed size could be as easily constructed and as satisfactorily used.

For uses where it is desired to keep the contents of the container away from open air the discharge spout of this device can be fitted with a hinged cover or a friction cap or a screw cap. The caps are especially adapted for use when the dispenser is made a part of a factory-filled container and it is desired to maintain a vacuum in the container, the latter practice being common in the case of coffee.

This device is an improvement over fixed-volume dispensing devices heretofore available in that this device delivers the measured volume simply by inverting the container to which it is attached. It does not require the use of two hands to operate it, or the pushing or pulling or twisting of some element.

The device can best be described with reference to the attached drawings, in which Figure 1 is a broken view being principally a vertical section along the major axis of the device, but showing a small portion of the base in elevation;

Figure 2 is a vertical section and elevation taken along section line 2—2 of Figure 1;

Figure 3 is a vertical section and elevation taken along section line 3—3 of Figure 2;

Figure 4 is a top view of the device;

Figure 5 is a detail of the discharge spout of the device, showing the use of a hinged cover to exclude air;

Figure 6 is a detail of the discharge spout of the device, showing the use of a friction cap to exclude air;

Figure 7 is a detail of a latch shown in Figure 1 for preventing backward movement of the rotor.

Referring to Figure 1, reference numeral 10 indicates a container to which the dispensing device is attached, in this case a conventional screw-cap jar such as is commonly used for coffee. The dispensing device is fitted with a base adapted to also serve as a means of fastening to the container the contents of which are to be handled. In Figure 1 the base and fastening means takes the form of a screw cap 11 to fit jar 10. Screw cap 11 has an opening 12 which serves as a throat for feeding the contents of the container into the dispensing device. The body of the dispensing device comprises mainly a short cylindric housing with side walls 13 and end walls 20 and 21 (see Figure 2). It communicates at its base with the container 10 through cylindric throat 12, and is fitted at the top with cylindric spout 14.

The throat 12 is shown to be the full width of the rotor housing, but when fine particles are to be dispensed it is advantageous to make this throat slightly narrower than the distance between the end walls 17 of the rotor. This reduces the tendency of particles to work into the narrow space between rotor walls 17 and housing walls 20 and 21.

The rotor as a whole is identified by reference numeral 15. This rotor fits snugly but freely inside of the housing 13 and comprises rotor side walls 16, rotor end walls 17 (see Figure 2), and a bisecting diaphragm 18. The bisecting diaphragm 18 divides the rotor into the identical measuring chambers A and B. The rotor is mounted concentrically with the housing side walls 13 on shaft 19. It will be noted that the side walls 16 of the rotor do not extend unbroken through the entire 360°. Openings C—D and E—F, comparable in size to throat 12 and spout 14 serve as the channels for filling and emptying the two measuring chambers A and B formed in the rotor by diaphragm 18. Latch 22, pivoted on bracket 23 serves a purpose which will be subsequently described in connection with the operation of the dispensing device. So also latch 24, pivoted on bracket 25.

Figure 2 is a vertical section and elevation, taken along section line 2—2 of Figure 1. Referring to this figure, end walls 17 of the rotor and end walls 20 and 21 of the housing have already been mentioned, as also have all elements indicated by lower reference numerals. Section line 1—1 has been placed on Figure 2 to identify the plane on which the sectional view in Figure 1 is taken. The remainder of Figure 2 can best be described in conjunction with Figure 3.

Shaft 19 extends the entire length axially of the dispensing device and has fastened to it in fixed relation not only rotor 15 but also ratchet wheel 26. The ratchet wheel teeth are cut in the manner indicated in Figure 3. Shaft 19 also carries weight 27, but this weight is not fastened to the shaft and it revolves freely about it. Weight 27 carries a spring pawl 28 fastened to the weight at 29. Stops 30 and 31 protrude from housing 21 and limit the movement of weight 27. The weight is shown at one limit of its course, against stop 30, and the opposite extreme of its motion, resting against stop 31, is indicated by dashed outline 32. The ratchet 26 and weight 27 are enclosed by housing 33. Housing walls 20, 21 and 33 are pierced to receive and support shaft 19. Wall 21 is not essential between rotor wall 17 and ratchet wheel 26, but is advantageous in keeping particles of matter from container 10 from getting in around the ratchet and weight.

Figure 4 is a top view of the dispensing device and all reference numerals appearing thereon have been identified in connection with Figures 1, 2 and 3.

Figure 5 is a detail of the discharge spout 14 fitted with a cover 34 hinged at 35, the hinge being put on the same side of spout 14 as the latch 22 so as to permit convenient pouring.

Figure 6 is a detail of the discharge spout 14 fitted with a friction cap 36 to exclude air. The outside of spout 14 and inside of cap 36 can advantageously be turned with a slight taper to give a tight fit. Also the cap may be of thin metal, lightly sweated on to permit easy removal, and thus permit packing the container and dispenser under vacuum.

Figure 7 is an enlarged view of latch 24 in throat 12 at the base of the dispensing device. Latch 24 is carried from the wall of throat 12 by bracket 25. The latch is designed to resist clockwise motion of rotor edge E and to permit of its being pushed down out of the way by counter-clockwise motion of rotor edge F or edge D.

The operation of the dispensing device is as follows. The screw cap 11 or other equivalent fastening means is fastened to the container 10, and if not already in that position the rotor 15 is brought into the position shown in Figure 1 with its openings C—D and E—F in register with the spout 14 and throat 12, respectively. This can be done by moving the rotor with the finger or by tilting the device to the necessary degree. For the purpose of this description it will be assumed that opening C—D of measuring chamber A is in register with pouring spout 14 and that container 10 is in an upright position and is filled with suitable material. To actuate this device it is necessary that the dispenser be inverted in a direction that would be contra-clockwise in respect to Figures 1 and 3, and whenever a motion is spoken of in this description as clockwise or contra-clockwise it means such direction with respect to Figures 1 and 3.

When the container and empty dispensing device are inverted by a contra-clockwise motion, material from container 10 will pour through throat 12 and opening E—F and fill measuring chamber B. When the device is so inverted, the weight 27 rotates freely around shaft 19 and falls to the position indicated in Figure 3 by reference numeral 32, its motion being limited by stop 31. When the weight moves in this clockwise direction from stop 30 to stop 31 the pawl 28 rides lightly over the teeth of ratchet 26 without turning the ratchet wheel and the shaft 19 which is fixed to the rotor 15.

Gravity will always keep weight 27 hanging below shaft 19 and when the inverted dispenser is returned to an upright position through a clockwise motion the pawl 28 attached to weight 27 will engage the teeth of ratchet wheel 26 and maintain the ratchet wheel and the rotor in an unchanged position with respect to the earth. this is assured by making weight 27 several times as heavy as the contents of a filled measuring compartment. Measuring chamber B was higher than measuring chamber A when the dispensing device was inverted and it retains that higher position when the dispensing device is restored to an upright position. After this first filling of one measuring chamber the device functions uniformly until container 10 is empty. Subsequent functioning is as follows. The device is now standing upright with measuring chamber B in the upper position, filled with material from container 10 in the last previous operation. When the container 10 and the dispenser are now inverted by a counter-clockwise motion the rotor retains a fixed position with respect to its housing and measuring chamber B pours its contents out through spout 14. Simultaneously measuring chamber A is being filled by material flowing downward into it through throat 12 from container 10. From this point on, the operation is precisely as described for the initial operation.

It will be noted that the movement of the dispensing device housing is always contra-clockwise to pour and clockwise in returning to an upright position, that the movement of the rotor is always contra-clockwise, that the rotor remains in fixed relation to its housing during the contra-clockwise motion to pour and remains in fixed relation to the earth during the clockwise motion of the container to an upright position. The weight 27 operating through pawl 28 on ratchet wheel 26 prevents clockwise rotation of the rotor 15. This is so because, as previously pointed out, the ratchet wheel 26 and the rotor 15 are both fastened in fixed relation to shaft 19 while weight 27 is not fastened to the shaft and is free to rotate independently within the limits of stops 30 and 31.

Rotor 15 does not move in fixed relation to its housing during the return from pouring position because of the restraining influence of weight 27, but it does not ordinarily fail to maintain fixed position with its housing when being inverted to pour. This results from the small amount of friction naturally present in the system and from the fact that the weight of the material in the measuring chamber is all above the shaft 19 and that tends to cause rotation in the one possible direction when equilibrium is disturbed.

A device of this character, to win public approval when put into wide use, must operate satisfactorily in all hands and even when abused and it is therefore fitted with latches 22 and 24. If pouring is done with a jerky and swift motion it is sometimes possible to impart enough momentum to the rotor with its unbalanced charge of material so that it will overrun its housing in the counter-clockwise motion and tend to carry the openings C—D and E—F beyond the spout 14 and throat 12. To prevent this possibility I provide a latch 22 which prevents the edges D and F from advancing ahead of the housing in the first portion of the pouring motion. Such restraint is needed only in the first portion of the pouring motion and the latch is designed to fall away from the path of the rotor in the final portions of the pouring motion. The latch hangs well away from the path of rotor edges D and F when the spout 14 passes back over them in starting to return to an upright position.

When weight 27 is moving from position against stop 30 to position against stop 31 the pawl 28 runs freely over the inclined sides of the ratchet teeth. If the pawl is made of sufficiently light and sensitive spring material it will not exert enough drag on the teeth to cause any rotation of the rotor in a clockwise direction but that possibility can always be provided against by a latch 24 positioned in throat 12. This latch is shown enlarged in Figure 7. It is carried on a bracket 25 and that portion of it below its pivot is made to weigh more than the upper portion so that it will stand upright in the early stages of the pouring motion and thus stand in position to prevent clockwise motion of the rotor. In those cases where this latch is called on to serve its function the rotor edge E or edge C will be bearing against it from an early stage of the pouring motion and thus hold it in operative position. If the rotor is not bearing against latch 24 the heavier weight in its lower portion will pull it out of the path of the rotor when the dispensing device is in a partially inverted position. Even when standing upright latch 24 cannot interfere with counter-clockwise rotation of the rotor because it is designed as shown to yield and move down out of the path of the rotor when the rotor is moving in its intended counter-clockwise direction.

In the appended claims, when I speak of successive reciprocative inversion I mean thereby a succession of cycles in which the dispensing device is in each cycle moved from an upright position to an inverted position and back to an upright position, the successive motions being a part revolution in one direction followed by a similar part revolution in the opposite direction. The successive inversions are described as reciprocative to distinguish from the successive inversions that would be performed by a continuing rotation of the device in a single direction. My device would not function if the motion from upright to inverted to upright were performed by a complete revolution in one direction: its functioning is dependent on a reciprocating motion in which the device is inverted from upright by a motion in one direction, followed by a motion in the opposite direction back to upright.

What I claim is:

1. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing; openings in diametrically opposite sides of the housing coinciding with the openings in the rotor, one such opening serving as a discharge spout and the other such opening serving as a filling throat; a container cover with means for fastening to said container, fitted with an opening; and a passageway from the opening in said container cover to the aforementioned filling throat of the housing; a shaft mounted axially of the cyclindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stock located on the housing to permit the weight to move 180° around the shaft from its position against the first-mentioned stop, and to prevent its moving substantially more than 180°.

2. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing, openings in diametrically opposite sides of the housing coinciding with the openings in the rotor, one such opening serving as a discharge spout and the other such opening serving as a filling throat; a container cover with means for fastening to said container, fitted with an opening, and a passageway from the opening in said container cover to the aforementioned filling throat of the housing; a shaft mounted axially of the cylindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stop located on the housing to permit the weight to move 180° around the shaft from its position against the first-mentioned stop, and to prevent its moving substantially more than 180°; a latch positioned on the housing adjacent the rotor which, when the dispensing device is in an upright position, falls into position to stop the rotating rotor with its opening in alignment with the aforementioned discharge spout and which falls out of the path of the rotor when the dispensing device is in an inverted position; and a second latch to prevent reverse rotation of the rotor.

3. A device for use in conjunction with a container for dispensing therefrom fixed volumes of dry material in the form of discrete particles, which comprises a hollow cylindric rotor divided on an axial plane into two equal measuring chambers, each chamber having an opening for filling and emptying, the two such openings being diametrically opposite; a housing fitted snugly around the rotor while yet free enough to permit easy movement of rotor in relation to housing, openings in diametrically opposite sides of the housing coinciding with the openings in the rotor, one such opening serving as a discharge spout and the other such opening serving as a filling throat; a container cover with means for fastening to said container, fitted with an opening, and a passageway from the opening in said container cover to the aforementioned filling throat of the housing; a shaft mounted axially of the cylindric rotor and fastened thereto and journaled in the ends of the rotor housing to maintain the rotor concentric therein; a ratchet wheel mounted on said shaft and fastened thereto; a weight hanging loosely pendent from the said shaft adjacent to the ratchet wheel and carrying a pawl engaging the teeth of said ratchet wheel; a stop located on the housing immediately alongside the position taken by the weight when the dispensing device is in an upright position, and on that side of the weight that will prevent motion of the weight in the direction that would cause the pawl to engage the teeth of the ratchet wheel; a second stop located on the housing to permit the weight to move 180° around the shaft from its position against the first-mentioned stop, and to prevent its moving substantially more than 180°; a pendent latch positioned on the pouring spout of the housing, hanging down when the dispensing device is in upright position, to stop the rotating rotor with its opening in alignment with the aforementioned discharge spout, and hanging out of the path of the rotor when the dispensing device is in an inverted position; and a second latch positioned in the filling throat to prevent reverse rotation of the rotor.

4. In combination, a container and a dispensing device comprising a hollow cylindric rotor fixedly mounted on an axial shaft and divided on an axial plane into two separate measuring compartments and having two openings, one for each compartment, located in the cylindrical surface of the rotor and positioned diametrically opposite one another; a housing fitting the rotor closely while not interfering with its free rotation, said housing being connected with the aforementioned container and having a port in communication therewith and in alignment with one of the two openings of the rotor, and having a second port diametrically opposite the first port; and means which, when actuated by successive reciprocative inversion, rotate the rotor to successively align a rotor opening with the housing port in communication with the container and then in communication with the opposite housing port, said means including a ratchet wheel fixedly mounted on the aforementioned shaft, a pendent weight loosely mounted on said shaft, and a pawl attached to said weight and positioned to transfer the rotative motion of the weight in one direction to the ratchet wheel and rotor.

IRA S. BOYDSTUN.

REFERENCES CITED

The following references are of record in the file of this patent:

UNITED STATES PATENTS

| Number | Name | Date |
|---|---|---|
| 136,643 | Clark | Mar. 11, 1873 |
| 335,940 | Livingston | Feb. 9, 1886 |
| 738,855 | Snyder | Sept. 15, 1903 |
| 852,603 | Hanlon | May 7, 1907 |
| 951,511 | Osincup | Mar. 8, 1910 |
| 1,165,907 | Riddle | Dec. 28, 1915 |
| 2,122,695 | Podwyszynski | July 5, 1938 |

FOREIGN PATENTS

| Number | Country | Date |
|---|---|---|
| 231,010 | Great Britain | Mar. 11, 1873 |
| 239,377 | Great Britain | Sept. 10, 1925 |
| 257,250 | Italy | Feb. 20, 1928 |
| 666,373 | Germany | Dec. 15, 1939 |